United States Patent [19]

Bizot et al.

[11] 3,833,490

[45] Sept. 3, 1974

[54] PROCESS FOR THE PREPARATION OF 3,5-DIIODO-4-HYDROXYBENZONITRILE OR 3-IODO-4-HYDROXY-5-NITRO-BENZONITRILE

[75] Inventors: Jean Bizot, Essonne; Jean Courteix, Val-de-Marne; Jean-Pierre Philipot, Hauts-de-Seine, all of France

[73] Assignee: Rhone-Poulene S.A., Paris, France

[22] Filed: Feb. 23, 1973

[21] Appl. No.: 335,178

[30] Foreign Application Priority Data

Feb. 25, 1972   France .............................. 72.06492

[52] U.S. Cl. ................................................ 204/78
[51] Int. Cl. ............................................ C07b 9/00
[58] Field of Search ................................ 204/78, 72

[56] References Cited
UNITED STATES PATENTS 3,386,899   6/1968   Shepard et al. ........................ 204/78

Primary Examiner—John H. Mack
Assistant Examiner—R. L. Andrews
Attorney, Agent, or Firm—Stevens, Davis, Miller & Mosher

[57] ABSTRACT

The compounds 3,5-diiodo-4-hydroxy-benzonitrile and 3-iodo-4-hydroxy-5-nitro-benzonitrile, which are known to possess herbicidal and chemotherapeutic properties respectively, are prepared by anodic iodination of a compound of the formula:

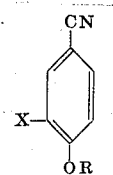

wherein X represents hydrogen, iodine or nitro, and R represents hydrogen, an alkali metal atom or alkanoyl of 1 through 4 carbon atoms, in an electrolysis cell in which the anolyte contains an alkali metal iodide or iodine and a solution or suspension of a compound of said formula.

18 Claims, No Drawings

PROCESS FOR THE PREPARATION OF 3,5-DIIODO-4-HYDROXYBENZONITRILE OR 3-IODO-4-HYDROXY-5-NITRO-BENZONITRILE

The present invention relates to a process for the preparation of 3,5-diiodo-4-hydroxy-benzonitrile of or -iodo-4-hydroxy-5-nitro-benzonitrile by electrolytic iodination of a nitrile of the general formula:

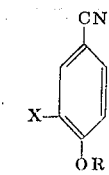
(I)

in which X represents a hydrogen or iodine atom or the nitro radical and R represents a hydrogen atom, an alkali metal atom or an alkanoyl radical containing 1 to 4 carbon atoms.

3,5-Diiodo-4-hydroxy-benzonitrile possesses noteworthy herbicidal properties which have been described in particular in Nature, 200, 28 (1963). 3-Iodo-4-hydroxy-5-nitro-benzonitrile possesses valuable chemotherapeutic properties which have been described in particular in the article by J.M.S. Lucas, Brit. Vet. J., 123, 198 (1967).

3,5-Diiodo-4-hydroxy-benzonitrile or 3-iodo-4-hydroxy-5-nitro-benzonitrile can be prepared by chemical iodination of a compound of the general formula (I), by using the processes which are described in French Patent Specification No. 1,375,311 (granted to May & Baker Ltd. on an application filed on September 24, 1963) or in Belgian Patent Specification No. 673,993 (granted to May & Baker Ltd. on an application filed on December 17, 1965).

It is known, in particular from L.L. Miller et al., J. Am. Chem. Soc., 92, 2821 (1970), to carry out the iodination of aromatic compounds e.g. benzene, toluene or xylenes, by electrochemical means. The process consists either of an oxidation of iodine in the presence of the benzene-type compound, or of an oxidation of iodine followed by the addition of the benzene-type compound. The iodine oxidation generally takes place on a platinum anode, using as anolyte an acetonitrile/lithium perchlorate mixture or an acetonitrile/tetra-n-propylammonium tetrafluoborate mixture. The quality of the anolyte has a great influence on the yield and the rate of the reaction. In particular, it is necessary to use rigorously anhydrous products.

The present invention provides a process for the preparation of 3,5-diiodo-4-hydroxy-benzonitrile or 3-iodo-4-hydroxy-5-nitro-benzonitrile, rapidly and with good yields, from a compound of the general formula (I) and an alkali metal iodide or iodine by electrolytic iodination in an aqueous or aqueous-organic medium.

The alkali metal iodide or iodine are oxidised electrochemically in the presence of a compound of the general formula (I) in a suitable medium. Generally, the compound of general formula (I) in which R represents an alkanoyl radical is converted in situ into a compound of the general formula (I) in which R represents a hydrogen atom or an alkali metal atom.

When an alkali metal iodide or iodine is used the following reaction scheme can be given for the process: a. starting from an alkali metal iodide:-

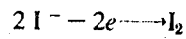
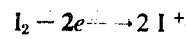

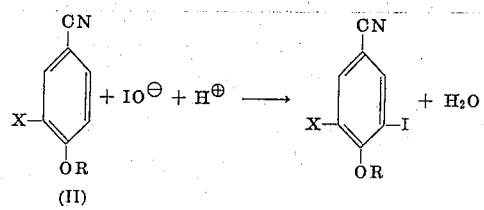
(II)

and, in the case where X represents a hydrogen atom, a second iodine atom is attached according to the following equation:

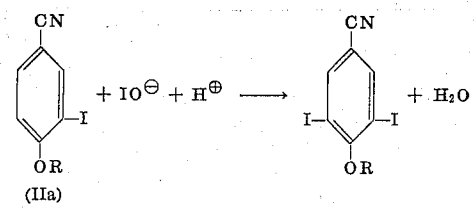
(IIa)

b. starting from iodine:

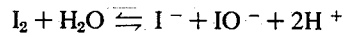

In formulae II and IIa X is as hereinbefore defined and R represents a hydrogen atom or an alkali metal atom.

The ion $IO^-$ formed during this reaction attacks the benzonitrile of the general formula (I) whilst the ion $I^-$ is oxidised according to the equation given under (a) into the $IO^-$ which reacts in turn with a product of the general formula (II) or (IIa).

The two processes (a) and (b) mentioned above can take place simultaneously because, when an alkali metal iodide is used, during the oxidation of the iodide, iodine forms and can undergo a disproportionation reaction according to the process defined under (b).

Overall, starting from one mol of a compound of the general formula (I), the electrolytic iodination requires the use of four electrons when an alkali metal iodide is used as the starting material and of two electrons when iodine is used as the starting material when X represents a hydrogen atom, and the use of two and one electrons respectively when X represents either an iodine atom or a nitro radical.

Starting from iodine, the amount of electricity necessary for carrying out the process will be half of the amount necessary when starting from an alkali metal iodide.

The electrolytic iodination can be carried out in an alkaline medium or in a neutral or slightly acid medium. When X represents a hydrogen or iodine atom, it is preferable to carry out the electrolysis in an alkaline or neutral medium. When X represents the nitro radical, it is preferable to use a compound of general formula (I) in which R represents a hydrogen atom and to carry out the electrolysis in a slightly acid medium.

The present invention provides a process for the preparation of 3,5-diiodo-4-hydroxy-benzonitrile or 3- iodo-4-hydroxy-5-nitro-benzonitrile by anodic iodination of a nitrile of general formula (I) wherein X and R are as hereinbefore defined by electrolysis of a solution of an alkali metal iodide or iodine in a cell comprising an anode, an anode compartment containing an anolyte, a separating diaphragm, a cathode compartment containing a catholyte and a cathode, in which a. the anode is solid and consists of a material on which the oxidation of the iodide ion takes place at a potential lower than the oxidation potential of the medium in which the iodide is dissolved (mixture of solvents, support electrolyte and organic products present), b. the separating diaphragm consists of a porous material, e.g., a sintered glass or porcelain plate, a microporous membrane or an ion exchange membrane and preferably a cation exchange membrane, c. the anolyte comprises a solution or suspension of a benzonitrile of the general formula (I), wherein X and R are as defined above, and of an alkali metal iodide or iodine in water or in an aqueous-organic mixture, the pH of the anolyte being between 4 and 12, preferably between 5 and 9, the amount of alkali metal iodide or iodine employed being 1 to 2 times the theoretical amount necessary for the iodination, and the concentration in the anolyte of the nitrile being between 0.1 and 50 g./l., d. the anolyte flows over the surface of the anode either by passing through a closed circuit with flow over the surface of the anode and removal at one end of the anode compartment followed by reinjection at another end of this same compartment, or by being contained in a reactor equipped with a stirrer and in which the anode is immersed, and e. the temperature of the anolyte is between 10° and 60°C.

Various organic liquids may be used as the organic component of the aqueous-organic mixture, for example alcohols containing one to three carbon atoms, amines (e.g., pyridine and triethylamine), nitriles containing two to four carbon atoms, dimethylformamide and dimethylsulphoxide. Methanol and acetonitrile are preferred. It is advantageous that the aqueous organic mixture be homogeneous.

According to a preferred method of carrying out the invention, the anode, the cathode and the separating diaphragm are located in vertical parallel planes. Moreover, several elementary electrolysis cells can be combined as in filter-presses.

Suitable materials of which the anode may be made, are for example, platinum, platinised titanium, stainless steel and graphite.

The cathode is in practice made of a solid material which conducts electricity and is electrochemically stable in the catholyte and under the working conditions of the cell. A material on which the hydrogen overvoltage is as low as possible is preferably used. By way of example, there may be mentioned platinum or metals in the platinum group of metals in the Periodic Table of Elements, used as bulk metals or deposited on a conducting material, e.g., stainless steel, graphite, vitreous carbon, titanium or tantalum.

The nature of the diaphragm which separates the anolyte from the catholyte is not crucial to the process of the invention. Thus it is possible to use any diaphragm consisting of a porous material, for example sintered glass, porcelain or microporous membranes, or ion exchange membranes. The membranes can be of the homogeneous or heterogeneous type. These membranes can optionally be reinforced by a screen. In order to allow electrolysis operations of long duration to be carried out, it is naturally preferred to use membranes which do not swell and which are stable in the presence of the various constituents of the anolyte and the catholyte. As membranes which can be used, there may be mentioned more particularly those which are described in United States Patent Specification No. 2,681,320 or French Patent Specifications Nos. 1,568,994, 1,575,782, 1,578,019, 1,583,089 or 1,584,187. The permeation selectivity of the membranes used (measured by the method described in French Patent Specification No. 1,584,187 (granted to Societe des Usines Chimiques Rhone-Poulenc on an application filed on September, 2, 1968) is preferably greater than 60 %.

The anolyte preferably consists of a solution or a suspension of a nitrile of general formula (I) and of an alkali metal iodide or iodine in water or in a mixture of water and acetonitrile or methanol, (containing 10 to 30% [by volume] and preferably 20% [by volume] of acetonitrile or methanol).

Of course, the anolyte contains, in addition, 3,5-diiodo-4-hydroxy-benzonitrile or 3-iodo-5-nitro-4-hyroxy-benzonitrile formed in the course of the reaction. At the start of electrolysis the anolyte will generally contain the nitrile of general formula (I) without 3,5-diiodo-4-hydroxy-benzonitrile or 3-iodo-4-hydroxy-5-nitro-benzonitrile; likewise, at the end of electrolysis, the anolyte contains 3,5-diiodo-4-hydroxy-benzonitrile or 3-iodo-4-hydroxy-5-nitro-benzonitrile without any substantial amount of the nitrile of general formula (I). During operation, the concentrations of 3,5-diiodo-4-hydroxy-benzonitrile or 3-iodo-4-hydroxy-5-nitro-benzonitrile and of the starting material of the general formula (I) can either be constant, when the reaction is carried out continuously, or can vary when the reaction is carried out discontinuously or when a continuous operation is started up.

As the catholyte, the electrolytic medium of the anolyte is preferably used but its nature and its composition are not crucial to the success of the process. The purpose of the catholyte is essentially to provide conductivity between the diaphragm and the cathode.

The electrolysis can be carried out at a constant current density of between 0.1 and 10 A/dm$^2$ or, preferably, at a controlled anode potential, for example, at a potential between −0.15 and +1 volt relative to a reference electrode of mercurous sulphate saturated with potassium sulphate. The reference electrode is of the Weston Standard cell type.

The amount of electricity employed corresponds to at least 4 Faradays per mol of product of the general formula (I) employed in the anolyte when the electrolysis is carried out using an alkali metal iodide and to at least 2 Faradays per mol of product of the general formula (I) when the electrolysis is carried out using iodine and when X represents a hydrogen atom. The amounts of electricity employed are decreased by half when X represents an iodine atom or the nitro radical.

The anolyte may be made to flow in a closed circuit usually by means of a pump. The circuit can, in addition, contain attached devices such as an expansion vessel or heat exchangers. An expansion vessel makes it possible in particular to supply the anolyte with the compound of general formula (I) and makes it possible to remove the anolyte in order to extract 3,5-diiodo-4-hydroxy-benzonitrile or 3-iodo-4-hydroxy-5-nitrobenzonitrile formed.

The catholyte can also be circulated; according to a preferred embodiment of the invention, the circuit of the catholyte is similar to that of the anolyte, which makes it possible to equilibrate the pressures on either side of the separating diaphragm.

According to another particular method of carrying out the invention, spacers are placed in the anode and-/or cathode compartments. These spacers serve to prevent the cation exchange membrane from being deformed on the one hand and to prevent this membrane from coming into contact with the electrodes on the other hand. They also serve to make the concentration of the anolyte more uniform and create regions of turbulence which assist the electrolysis. The spacers are generally manufactured from synthetic polymers which are chemically inert and which do not conduct electricity. They can be made in the form of interlaced, intertwined, knotted or welded yarns (woven fabrics, grids or nets) or in the form of sheets equipped with holes or grooves. In practice, these spacers are oriented along planes parallel to those of the electrodes and of the diaphragm.

In the absence of spacers, the speed of flow of the anolyte through the anode compartment is usually greater than 10 cm/second, and preferably greater than 50 cm/second. When a spacer is used, the apparent speed of the anolyte i.e., the speed calculated from the rate of flow of the anolyte through the anode compartment, is usually greater than 1 cm/second, and preferably greater than 10 cm/second.

At the end of electrolysis, 3,5-diiodo-4-hydroxybenzonitrile or 3-iodo-4-hydroxy-5-nitro-benzonitrile is isolated in manner known per se. The electrolysis solution is preferably treated with sodium thiosulphate and then acidified with sulphuric acid. 3,-5-Diiodo-4-hydroxybenzonitrile or 3-iodo-4-hydroxy-5-nitro-benzonitrile, which are insoluble in an acid medium, precipitate and are isolated by filtration or decanting.

The process according to the invention possesses numerous advantages because it makes it possible to use electrolysis cells which are compact and easy to dismantle, to connect easily in series various elementary electrolysis cells, and to use electrolysis cells with electrodes in the vertical position.

Furthermore, the process according to the invention has the advantage, relative to chemical processes, of avoiding the oxidation of organic substrates and the formation of by-products which are of no value.

The following Examples illustrate the process according to the invention:

EXAMPLE 1

The iodination of 4-hydroxy-benzonitrile to give 3,5-diiodo-4-hydroxy-benzonitrile is carried out in an electrolysis cell possessing the following characteristics:

The cell is a 300 cc glass vessel with a double jacket.

The anode is a perforated platinum sheet, the apparent surface area of which is approximately 10 $cm^2$.

The cathode is a perforated platinum sheet, the apparent surface area of which is approximately 5 $cm^2$; it is placed in a vertical glass tube, the lower end of which is immersed in the anolyte and is closed by a piece of sintered glass of porosity 4, covered over a height of one centimetre with an agar gel containing potassium nitrate. This glass tube contains the catholyte and has a capacity of approximately 50 cc.

A reference electrode of mercurous sulphate saturated with potassium sulphate is immersed in the anolyte contained in the vessel forming the cell. The electrode comprises a membrane which separates the electrolyte in the reference electrode from the said anolyte.

The anolyte is stirred by means of a magnetic stirrer.

The electrolysis conditions are as follows:
potential applied to anode: +0.200 V relative to the reference electrode;
current density: approximately 3 A/$dm^2$;
voltage at the terminals of the cell: 12 V, decreasing during the electrolysis, and
temperature of the anolyte (not controlled): 20°–25°C. to 40°C.

The anolyte introduced initially consists of a solution of 2.38 g. of 4-hydroxy-benzonitrile and 9.96 g. of potassium iodide in 200 cc. of a 5% strength aqueous solution of sodium bicarbonate.

The catholyte consists of 20 cc. of a 5% strength aqueous solution of sodium bicarbonate.

Electrolysis is carried out for the period of time necessary for 7,720 coulombs to pass, corresponding to 4 Faradays per mol of 4-hydroxy-benzonitrile. After stopping the electrolysis, the anolyte is stirred for approximately 1 hour and then acidified to pH 2 with approximately 60 cc. of 2N sulphuric acid in order to precipitate 3,5-diiodo-4-hydroxy-benzonitrile. The precipitate is filtered off, washed with 50 cc. of 2N sulphuric acid, washed with water until the excess iodide and the sodium sulphate formed have been removed, and dried in an oven at 80°C. and then at 110°C. 7.23 g. of 3,5-diiodo-4-hydroxy-benzonitrile, which melts at 207°–208°C., are thus obtained.

Thin layer chromatography shows that this product contains a total of less than 1% of impurities, which include 3-iodo-4-hydroxy-benzonitrile, 4-hydroxybenzonitrile, 3,5-diiodo-2-hydroxy-benzonitrile, 3,5-diiodo-4-hydroxy-benzamide and 2,4,6-triiodo-phenol.

The chemical yield from the 4-hydroxy-benzonitrile initially employed is 97%.

EXAMPLE 2

The iodination of 4-hydroxy-benzonitrile to give 3,5-diiodo-4-hydroxy-benzonitrile starting from 4-acetoxy-benzonitrile is carried out in an electrolysis cell of the filter-press type which possesses the following characteristics: the anode consists of a sheet of platinised titanium; the cathode consists of a sheet of stainless steel; the useful surface area of each of these electrodes is 2 $dm^2$; the separating diaphragm is a cation exchange membrane of the homogeneous type based on sulphonated polysulphone reinforced by a screen of polyester yarns, the permeation selectivity of which is 88–90% and the substitution resistance of which is 5–6 $\Omega cm^2$; the electrode-membrane distance is 4 mm. Spacers, consisting of interlacing polypropylene yarns, are located in the anode and cathode compartments to maintain the membrane between the cathode and the anode and two pumps cause the anolyte and the catholyte to flow through the anode and cathode compartments of the cell respectively.

The circuits in which the anolyte and the catholyte flow each contain an expansion vessel consisting of a 250 cc. three-necked flask placed in a heating mantle so as to keep the temperature of the circuits at about 50°C. The flask is connected to the atmosphere via a reflux condenser cooled by running water. Supply and removal pipelines pass through the other two orifices of the flask.

Just at the outlet of the electrolysis cell, the anolyte circuit contains a reference electrode of mercurous sulphate saturated with potassium sulphate.

The electrolysis conditions are as follows: current density applied: 1.5 A/dm$^2$; anode potential: −0.15 V to +0.14 V relative to the reference electrode;
  voltage at the terminals of the cell: 2 V;
  temperature of the anolyte and the catholyte: controlled at 50°C, and
  rate of flow of the anolyte and the catholyte over their respective electrodes: approximately 5 cm/second.

The anolyte introduced initially consists of a solution prepared in the following way:
  25 g. of sodium bicarbonate, 31.2 g. of potassium iodide and 50 cc. of acetonitrile are added to a solution of 10.06 g. of 4-acetoxy-benzonitrile in 200 cc. of a 2.5% strength aqueous solution of sodium hydroxide.

The catholyte consists of 250 cc. of a 10% strength solution of sodium bicarbonate in a water/acetonitrile mixture (8/2 by volume).

Electrolysis is carried out for the period of time necessary for 25,331 coulombs to pass, corresponding to 5% more than the theoretical amount of electricity of 24,125 coulombs, calculated at the rate of 4 Faradays per mol of crude 4-acetoxy-benzonitrile. After stopping the electrolysis, the anolyte is removed and then stirred for approximately 1 hour at a temperature of about 50°C. 0.1N sodium thiosulphate solution is then added to it, until it is decolourised, in order to reduce the excess iodine, and the whole is filtered. The filtrate is acidified with approximately 160 cc of 2N sulphuric acid. After treating the precipitate as indicated in Example 1, 21.2 g. of 3,5-diiodo-4-hydroxy-benzonitrile, which melts at 207°–208°C., are obtained.

Thin layer chromatography shows that this product contains a total of less than 1% of impurities.

The chemical yield, from the 4-acetoxy-benzonitrile initially used, is 92%.

EXAMPLE 3

The iodination of 4-hydroxy-benzonitrile to give 3,5-diiodo-4-hydroxy-benzonitrile, starting from 4-acetoxy-benzonitrile, is carried out in an electrolysis cell identical to that which was described in Example 1.

The electrolysis conditions are as follows: current density applied: 3 A/dm$^2$;
  anode potential: 0.3 to 0.6 V relative to the reference electrode;
  voltage at the terminals of the cell: 12 V, and temperature of the anolyte: controlled at 50°C. by a flow of water in the double jacket of the cell.

The anolyte introduced initially is prepared in the following way:
  20 g. of sodium bicarbonate, 25 g. of potassium iodide and 40 cc. of methanol are added to a solution of 8.05 g. of 4-acetoxy-benzonitrile in 160 cc. of water containing 4g. of sodium hydroxide pellets.

The catholyte consists of 20 cc. of a 10% strength solution of sodium bicarbonate in a water/methanol mixture (8/2 by volume).

Electrolysis is carried out for the period of time necessary for 21,300 coulombs to pass (10% more than the theoretical amount of 19,300 coulombs calculated at the rate of 4 Faradays per mol of 4-acetoxy-benzonitrile). At the end of the electrolysis, the anolyte is treated in the same way as in Example 2. 17.57 g. of 3,5-diiodo-4-hydroxy-benzonitrile, which melts at 206°–207°C., are thus obtained.

Thin layer chromatography shows that this product contains a total of less than 1% of impurities.

The chemical yield from the 4-acetoxy-benzonitrile initially employed is 95%.

EXAMPLE 4

The iodination of 3-nitro-4-hydroxy-benzonitrile to give 3-iodo-4-hydroxy-5-nitro-benzonitrile is carried out in an electrolysis cell possessing the following characteristics:

The cell is a glass vessel with a useful volume of 200 cc. The cathode compartment is a vertical glass tube, the lower end of which is immersed in the anolyte and is closed by an ion exchange membrane, the latter being held in place by a Teflon ring which is screwed onto the lower end of the tube. Leak-tightness is achieved by two annular Teflon joints which clamp the membrane. The glass tube contains the catholyte and has a capacity of approximately 250 cc. The membrane used is a cation exchange membrane of the homogeneous type (membrane AMFION C 103). The cathode is a perforated platinum sheet of apparent surface area approximately 5 cm$^2$.

The anode is a platinum grid, the apparent surface area of which is approximately 10 cm$^2$. It is placed under the membrane, parallel to the latter, at a distance of approximately 1 cm. A reference electrode of mercurous sulphate saturated with potassium sulphate is immersed in the anolyte contained in the vessel forming the cell. The anolyte is stirred by means of a magnetic stirrer.

The electrolysis conditions are as follows: potential applied to anode: +0.600 V relative to the reference electrode;
  current density: 6 to 0.2 A/dm$^2$;
  voltage at the terminals of the cell: 7 to 3 V, and temperature of the anolyte (not controlled): 20°–25° to 30°C.

The anolyte introduced initially consists of a solution prepared in the following way:
  1.64 g. of 3-nitro-4-hydroxy-benzonitrile and 0.4 g. of sodium hydroxide pellets are dissolved in a mixture of 45 cc. of water and 30 cc. of acetonitrile.

25 cc. of acetic buffer at pH 5.0 (2M aqueous solution of sodium acetate to which glacial acetic acid has been added) and 2.5 g. of potassium iodide are added to this solution.

The catholyte consists of 25 cc. of 0.5M acetic buffer of pH 5.0 (2M aqueous solution of sodium acetate to which glacial acetic acid has been added, diluted with 3 times its volume of water).

Electrolysis is carried out for the period of time necessary for 3,300 coulombs to pass (corresponding to 1.7 times the theoretical amount of 1,930 coulombs calculated at the rate of 2 Faradays per mol of 3-nitro-4-hydroxy-benzonitrile). After stopping the electrolysis, the anolyte is removed and then left to stand overnight. 0.1 N sodium thiosulphate solution is then added to it until it is decolourised, in order to reduce the excess iodine, and the whole is acidified with 2N sulphuric acid until the pH is less than 1 in order to precipitate 3-iodo-4-hydroxy-5-nitro-benzonitrile. The precipitate is filtered off and washed with water until the excess potassium iodide, sodium sulphate and acetic acid have been removed, and then it is dried in an oven at 80°C. and then at 100°C. to constant weight. 2.85 g. of 3-iodo-4-hydroxy-5-nitro-benzonitrile, which melts at 136°–137°C., are thus obtained.

Thin layer chromatography shows that this product contains less than 0.2% of 3-nitro-4-hydroxy-benzonitrile. The infra-red spectrum of the isolated product agrees with that of a reference sample.

The chemical yield from the 3-nitro-4-hydroxy-benzonitrile initially employed is 98%.

We claim:

1. Process for the preparation of 3,5-diiodo-4-hydroxybenzonitrile or 3-iodo-4-hydroxy-5-nitro-benzonitrile by anodic iodination of a nitrile of the formula:

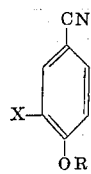

(I)

wherein X represents hydrogen, iodine or nitro, and R represents hydrogen, an alkali metal atom or alkanoyl of 1 through 4 carbon atoms, by electrolysis of a solution of an alkali metal iodide or iodine in a cell comprising an anode, an anode compartment containing an anolyte, a separating diaphragm, a cathode compartment containing a catholyte and a cathode, in which:

a. the anode is solid and consists of a material on which the oxidation of the iodide ion takes place at a potential lower than the oxidation potential of the medium;
b. the separating diaphragm consists of a porous material or of an ion exchange membrane;
c. the anolyte comprises a solution or suspension of a nitrile of formula (I), wherein X and R are as defined above, and an alkali metal iodide or iodine in water or in an aqueous-organic mixture, the pH of the anolyte being between 4 and 12, the amount of alkali metal iodide or iodine employed being 1 to 2 times the theoretical amount necessary for the iodination, and the concentration in the anolyte of the nitrile being between 0.1 and 50 g./l.,
d. the anolyte flows over the surface of the anode,
e. the temperature of the anolyte is between 10° and 60°C., and
f. the product obtained is 3,5-di-iodo-4-hydroxybenzonitrile when X is hydrogen or iodine and 3-iodo-4-hydroxy-5-nitrobenzonitrile when X is nitro.

2. Process according to claim 1 in which X represents hydrogen.

3. Process according to claim 1 in which the anode is platinum, platinised titanium, stainless steel or graphite.

4. Process according to claim 1 in which the anolyte comprises a solution or a suspension of a nitrile of formula (I) as defined in claim 1 in water or a mixture of water and acetonitrile or methanol, containing 10 to 30% by volume of acetonitrile or methanol.

5. Process according to claim 1 in which the initial constitution of the catholyte is the same as that of the anolyte, except that the catholyte does not contain the nitrile of formula (I).

6. Process according to claim 1 in which the electrolysis is carried out at a constant current density of between 0.1 and 10 A/dm$^2$.

7. Process according to claim 1 in which the electrolysis is carried out at a controlled anode potential of between −0.15 and +1 volt relative to a reference electrode of mercurous sulphate saturated with potassium sulphate.

8. Process according to claim 1 in which the pH of the anolyte is between 5 and 9.

9. Process according to claim 1 in which, when X in the compound of formula (I) represents hydrogen or iodine, the iodination is carried out at pH 7 to 12.

10. Process according to claim 1 in which, when X in the compound of formula (I) represents nitro, R represents a hydrogen atom and the iodination is carried out at pH 4 to 7.

11. Process according to claim 1 in which the cathode is platinum or a metal of the platinum group of metals in the Periodic Table of Elements, used as the bulk metal or deposited on stainless steel, graphite, vitreous carbon, titanium or tantalum.

12. Process according to claim 1 in which the separating diaphragm is a cation exchange membrane.

13. Process according to claim 1 in which the anode, the cathode and the separating diaphragm are located in vertical parallel planes.

14. Process according to claim 1 in which the anode or cathode, or anode and cathode, compartments contain spacers and the apparent speed of the anolyte through the anode compartment is greater than 1 cm/second.

15. Process according to claim 1 in which the speed of flow of the anolyte through the anode compartment is greater than 10 cm/second.

16. Process according to claim 1 in which the anolyte is made to flow over the surface of the anode by circulating it in a closed circuit by removal of anolyte at one end of the anode compartment and re-injection at another end of this same compartment.

17. Process according to claim 1 in which the anolyte in the anode compartment is stirred to cause flow of the anolyte over the anode surface.

18. Process according to claim 16 in which the catholyte is also circulated and the pressure on either side of the diaphragm separating anolyte and catholyte is equilibrated by using similar circuits for the anolyte and catholyte.

* * * * *